United States Patent
Bown

(10) Patent No.: US 6,390,684 B2
(45) Date of Patent: May 21, 2002

(54) METHOD AND APPARATUS FOR REDUCING STRESS ON ROTATING SHAFT BEARINGS

(75) Inventor: David C. Bown, Northborough, MA (US)

(73) Assignee: GSI Lumonics Corporation, Billerica, MA (US)

( * ) Notice: Subject to any disclaimer, the term of this patent is extended or adjusted under 35 U.S.C. 154(b) by 0 days.

(21) Appl. No.: 09/898,855

(22) Filed: Jul. 3, 2001

Related U.S. Application Data

(60) Provisional application No. 60/215,831, filed on Jul. 3, 2000.

(51) Int. Cl.[7] ............................................. F16C 27/06
(52) U.S. Cl. ................................................... 384/535
(58) Field of Search ......................... 384/99, 535, 536, 384/581, 582

(56) References Cited

U.S. PATENT DOCUMENTS

| | | | |
|---|---|---|---|
| 4,647,227 A | * 3/1987 | Clebant | 384/99 |
| 4,760,734 A | 8/1988 | Maxwell | |
| 5,225,770 A | 7/1993 | Montagu | |
| 5,280,377 A | 1/1994 | Chandler et al. | |
| 5,462,361 A | * 10/1995 | Sato et al. | 384/99 X |
| 5,730,531 A | 3/1998 | Pinkos et al. | |
| RE36,270 E | 8/1999 | Duggan | |
| 6,116,784 A | * 9/2000 | Brotz | 384/99 |
| 6,196,721 B1 | * 3/2001 | Farkaly | 384/99 |

OTHER PUBLICATIONS

PCT International Search Report dated Nov. 15, 2001 of International Application No. PCT/US01/21146 filed Jul. 3, 2001.

* cited by examiner

Primary Examiner—Thomas R. Hannon
(74) Attorney, Agent, or Firm—Vernon C. Maine; Scott J. Asmus

(57) ABSTRACT

In a reciprocating rotor device such as a scanning galvanometer, a bearing assembly consisting of a rheological bearing coupler interposed between the rotor shaft and the bearing support structure or housing, where the rheological bearing coupler is relatively stiff during constant-velocity portions of rotor rotation, assuring adequate geometrical precision of the rotor within the rotor housing during the scanning phase. When loaded beyond a design load threshold by acceleration-induced moments causing lateral or asymmetrical force applied between the shaft and the bearing support structure during changes in rotor speed, becomes relatively compliant or resilient, absorbing a portion of the load at the expense of momentary axial misalignment of the rotor, then returning to original shape and realigning the rotor to it's correct precision axial position when the acceleration forces are abated.

25 Claims, 4 Drawing Sheets

METHOD AND APPARATUS FOR REDUCING STRESS ON ROTATING SHAFT BEARINGS

RELATED APPLICATION

This application claims priority to U.S. Application Serial No. 60/215,831, filed on Jul. 3, 2000.

BACKGROUND OF THE INVENTION

1. Technical Field of the Invention

This invention relates to devices having rotating shafts supported by end bearings, and in particular to scanning galvanometers and other reciprocating rotor devices wherein rotor acceleration contributes to repetitive asymmetrical loading on the rotor bearings.

2. Background Art

The rotor and load of a galvanometer scanner have mass, and as a result act like a gyroscope rotor when rotating. Because of this, the rotor-load assembly resists any attempt to change the axis of rotation, and also any attempt to change its speed of rotation. This phenomenon is recognized in the motions of a toy top, which stands upright on it's tip when first released, and then begins to tip it's axis of rotation with respect to gravity and to precess that axis as friction with the air and between the tip and the surface upon which it rests gradually slow down the spin.

Galvanometer scanners are not often exposed to forces which attempt to change the tilt of the axis, although they can be in some applications on mobile platforms. On the other hand, galvanometer scanners are almost always used in applications in which the speed of rotation is changed rapidly, and in the limit, reversed in sense. In fact, it is one of the attributes sought in galvanometer scanners that they be capable of extremely rapid changes in rotational speed and direction. For example, it is common to have a beam scanning galvanometer with a rotor motion that is represented as continuous saw-tooth waveform in which one cycle consists of a constant velocity period of movement in one direction for "scanning", followed by a rapid fly-back period of slowing and reversing of direction, motion in the other direction, slowing and reversing direction again, and re-acceleration to scan speed. Any of these changes results in an attempt by the rotor and its load to precess, and the attendant moments are resisted by the bearings which support the rotor and load.

Examples that may provide context for the reader include the prior art of Montagu's U.S. Pat. No. 5,225,770, which illustrates a conventional rotor and bearing arrangement. The prior art of Chandler's U.S. Pat. No. 5,280,377 provides a contextual explanation of the forces to which a scanning galvanometer rotor of this sort is subjected, including the acceleration forces occurring during the fly back period between constant speed forward scan.

In addition, any imbalance in the rotating parts causes the rotor assembly to attempt to rotate on an axis which passes through the mass center, and to the degree that this axis departs geometrically from the rotor axis, a set of additional moments is imposed periodically on the bearings. As a practical matter, some degree of imbalance is always present in a working galvanometer scanner.

In the limit, these moments can exceed the load rating of the bearings, and cause irreversible damage to the bearing parts, in particular the raceways and balls, which leads to loss of smoothness of operation and eventually to failure of the bearing.

Since these issues are not confined to galvanometer scanners, and are characteristic of all rotating machinery, much effort has been devoted to ameliorating the effects of the gyroscopic moments on bearings. Modern rotating machinery, like galvanometer scanners, is balanced to the highest degree of precision practicable. Bearings have been developed to display very great resistance to what is called in the trade "Brinelling", a name for the localized dents in the balls and rings which results from exceeding the elastic limit of the materials. Special materials, such as ceramics, which have very high elastic limits in compression, have been used. However, galvanometer designers continue to produce designs which are capable of greater accelerations than the bearings can stand.

Moving for background purposes to an unrelated field of art; rheology is defined as the science of the flow and deformation of matter. Some materials approach the behavior of ideal fluids and are described as being viscous. Other materials approach the behavior of ideal solids and are described as being elastic. Visco-elastic materials may be formed into fabricated useful shapes having desirable rheological properties.

Load shock and vibration from other sources also cause potentially damaging asymmetrical bearing loads. Devices for dampening irregular, externally induced load shock and vibration in rotating assemblies, such as road surface effects in vehicle axle bearing assemblies, have been the subject of patents. By way of example, Pinkos et al's U.S. Pat. No. 5,730,531 discloses a center bearing assembly with rheological fluid for dampening vibrations. An electromagnetic field, varied by an electronic controller in relation to the axle speed, acts on the rheological fluid in the dampener, to increase or decrease the effectiveness of the dampener as between the center bearing and the support structure.

In another vibration dampening application, Duggan's U.S. Pat. No. RE36270, reissue of U.S. Pat. No. 5,452,957, first published in Sep. 26, 1995, discloses a vehicle axle and bearing assembly, with the axle and center bearing supported within a donut-shaped bladder formed of an elastomeric material and filled with a rheological fluid, the assembly being attached by a suitable support bracket to the vehicle. A controllable source of electromagnetic field is located adjacent the bladder, and used to vary the flow or shear characteristics of the rheological fluid in the bladder, thus offering a variable dampening capability.

The rheology art described above has no where been suggested as useful for or applicable to the general art and the particular shortcomings of high speed reciprocating rotor and galvanometer bearings as to the problem of out of balance conditions and asymmetrical bearing loads and damage caused by acceleration.

SUMMARY OF THE INVENTION

As was intimated in background section, in the special case of galvanometers scanners and other similar high speed reciprocating rotor devices, what is often desired is a scan or rotary position versus time profile which might, for example, be a saw-tooth waveform in which there is a constant velocity period followed by a rapid fly-back period, similar to the horizontal scan waveform of a television tube. Of course, in the television tube, it is an electron beam, rather than a rotor of significant mass, that is being manipulated.

Just as in the case of the television tube, the part of the scan which is required to be precise is the constant velocity "forward" portion. The fly back portion is relatively uncontrolled, but is required to take place in the shortest possible time. As a result, a very large acceleration is applied at the end of the forward scan to slow and reverse the direction of rotation, return the rotor to the other end of its angular path, slow and reverse its direction again, and re-accelerate it to scan speed. The degree of difference in the asymmetrical loading between the scan phase and the fly back phase is substantially the result of rotor acceleration. It is the gyroscopic loads induced by these accelerations which have the most potential for damage to the bearings, but which occur during the part of the scan which is not required to be under precise geometrical control.

This observation leads to the possibility of providing a coupling between the bearings and their housing which is stiff during the constant-velocity portion of the scan, assuring adequate geometrical precision, but is resilient during the period of large bearing moments. This coupling would desirably absorb some or most of the force applied between the bearing and it's housing during rotor acceleration by deflecting, but would return to it's initial position when the acceleration forces disappeared.

In pursuit of the goals of the invention, such a coupling has been successfully constructed by placing a visco-elastomeric "O" ring or a multiplicity of "O" rings in a concentric fashion between the outer raceway of each bearing and the bearing housing. The composition of the "O" ring material is selected to provide the best absolute stiffness, relating and affecting the necessary rigidity of the rotor alignment to assure precision during the constant speed forward scan. Spacers between the "O" rings control the degree of compression of the elastomer rings, and thus their relative stiffness, during the fly back periods of relatively high asymmetrical loading.

Many elastomers display non-linear rheological effects. These materials, like glass, are not really solids. They can be thought of as super-cooled fluids. As a result, they flow slowly in the presence of even very small forces. The most often encountered and recognizable consumer product example of these materials is Silly-Putty™ bulk play material, which is a silicon-based, visco-elastic, non-Newtonian fluid constructed to display the unusual attributes of these materials in a most graphic way. (No claim is made to the trademark, Silly-Putty™.) For the adults among us, the modern golf ball is another example.

A way of visualizing the mechanism is this. The molecules making up the material are very high molecular weight polymers whose structure is asymmetric, so that the molecules twist themselves up into tight spirals. The tightness of the spiral is a measure of the energy contained in the molecule. As a result, these spirals are quite temperature sensitive.

In the case of rubber, when you heat a rubber band, that is, add energy to the molecules, the spirals get tighter, and the rubber band shrinks in length, displaying what appears to be a negative temperature coefficient of expansion. Other examples of this molecular twisting are the reaction of spiro-paran dyes to exposure to light of the correct wavelength. These dyes, commonly used in welder's face shield lenses, capture the UV energy from the arc and tighten up their twist so that they are no longer transparent to the harmful radiation emitted by the arc. When the arc is quenched, the dye looses the stored energy and un-twists, again becoming transparent. This process is so fast that the welder is not conscious of the initial flash of the arc.

Of course, in the instant application, neither heat nor light play an essential part in the material's response to changes in loading. Instead, the mechanical forces do the work. At first, the material displays high stiffness (assuming it has been optimized for the application), because the molecular "springs" are tightly twisted, and the spirals interfere with each other. This is the condition during the forward scan. Under the high loading forces produced by acceleration, the springs eventually stretch enough so that the coils interfere less and less, and the molecules begin to slide past each other. This is the non-linear low-stiffness phase. When the forces are reduced at the end of the acceleration period, the material coils itself back into the high-stiffness phase.

In general, the stiffness curve has the shape of an inverted hockey stick. The initial relatively flat portion represents the area in which the material acts like a bunch of tiny springs in parallel, the joint between the blade and the handle the transition region, and the high-negative-slope handle represents the area in which the almost-straightened-out molecules slide past each other relatively easily.

In accordance with the invention, the appropriate stiffness characteristics of the "O" ring are established in each application as a compromise between the degree of geometrical precision desired during the high-precision forward scan, and the degree of compliance required to absorb the shock-like forces during the fly-back. Both the selection of the visco-elastomeric material, and the geometry of the these elements and of the bearing assembly as a whole, control the initial spring constant, the transitional force, the time rate of change in the transition area of the curve, and the rate of change of the slope in the transition area of the curve. In summary, this novel methodology of introducing a rheological bearing coupler (RBC) into the bearing assembly of galvanometer scanners used in high duty cycle applications, and in other devices employing reciprocating rotors in a similar fashion, to relieve bearing stresses during periods of acceleration, results in a significant increase in the life expectancy of the bearings.

Other objects and advantages of the present invention will become readily apparent to those skilled in this art from the following detailed description, wherein we have shown and described only a preferred embodiment of the invention, simply by way of illustration of the best mode contemplated by us on carrying out our invention.

DESCRIPTION OF THE PREFERRED EMBODIMENT

Figure 1:
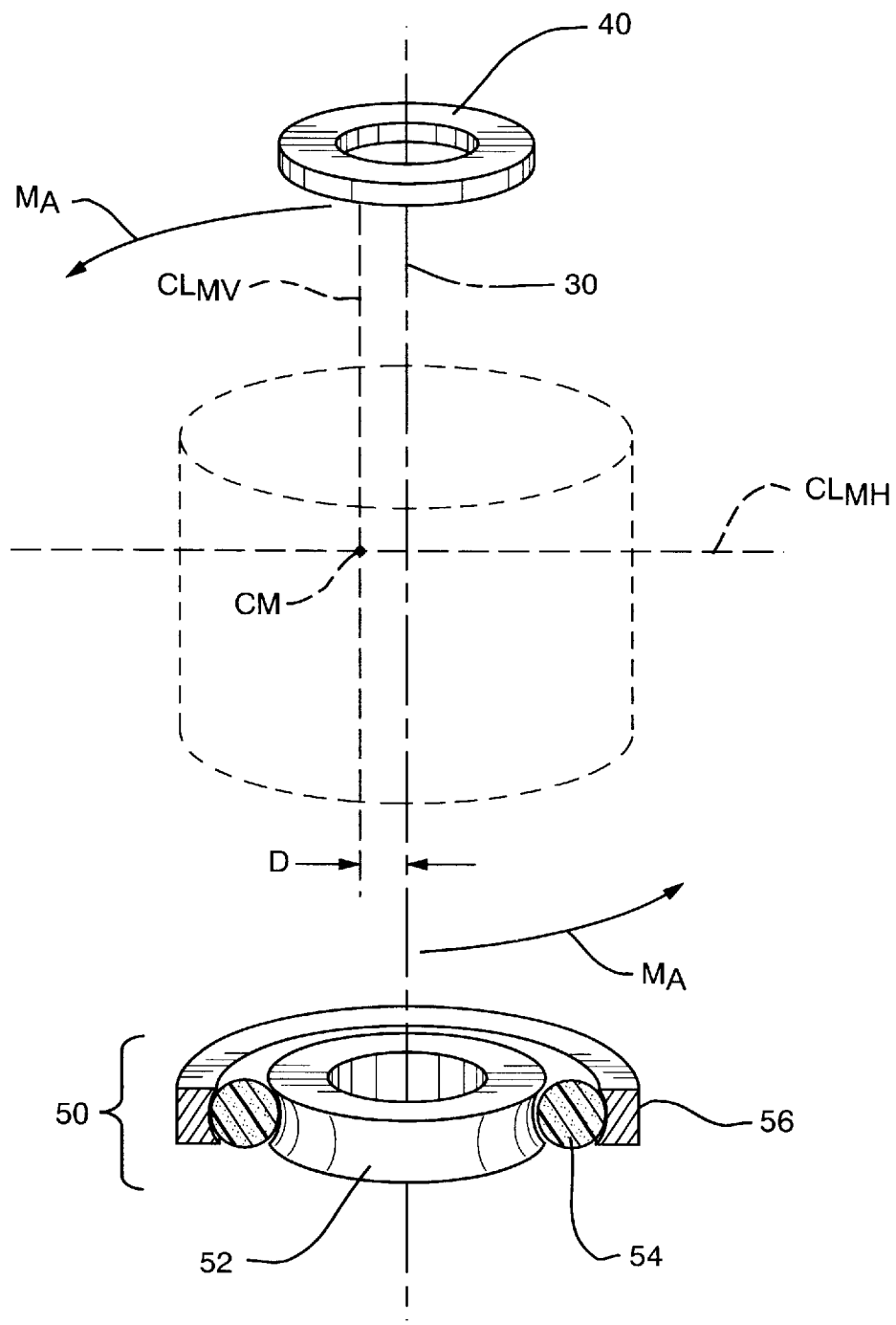
FIG. 1 is a diagrammatic perspective view of a rotor, showing the shaft center line, centerlines of mass, center of mass, upper and lower bearings, and moment arms induced by acceleration of rotor speed.

The preferred embodiments are illustrative, but not limiting, of the scope of the invention. They amply demonstrate the technique and the source of the benefits achieved by the invention. Referring to the FIG. 1 diagrammatic presentation, rotor 10 has a mass 20 and shaft centerline 30, and is supported by upper and lower bearing assemblies 40 and 50. Rotor 10 has vertical centerline of mass $CLM_V$ and horizontal centerline of mass $CL_{MH}$, defining its center of mass CM, which may be offset from the shaft centerline 30 by distance D (not to scale).

Bearing assemblies 40 and 50 are identical or very similar in size and configuration. Lower bearing assembly 50 is further detailed FIG. 1 in order to show the principal parts of the assembly. Main bearing 52 is configured with a semicircular outer support channel about its perimeter. Sized for a closely conforming compressive fit to main bearing 52, is rheological bearing coupler (RBC) O ring 54, shown here in cross section for clarity. Outer raceway 56, also shown here in cross section for clarity, has a semicircular inner support channel which closely confirms to the normal diameter of and contains O ring 54. This trio of elements comprises lower bearing assembly 50, which as stated above, is similar or identical to upper bearing assembly 40.

It will be clearly evident to those skilled in the art that acceleration of the rotational speed of rotor 10 introduces moments $M_A$, about center of mass CM, as asymmetrical loads on bearing assemblies 40 and 50. While offset distance D is by design as small as possible, even very small amounts of offset between the axis of support and the center of mass will introduce a further order of asymmetry, or imbalance, to the load on the bearings, when acceleration is very high.

Figure 2:
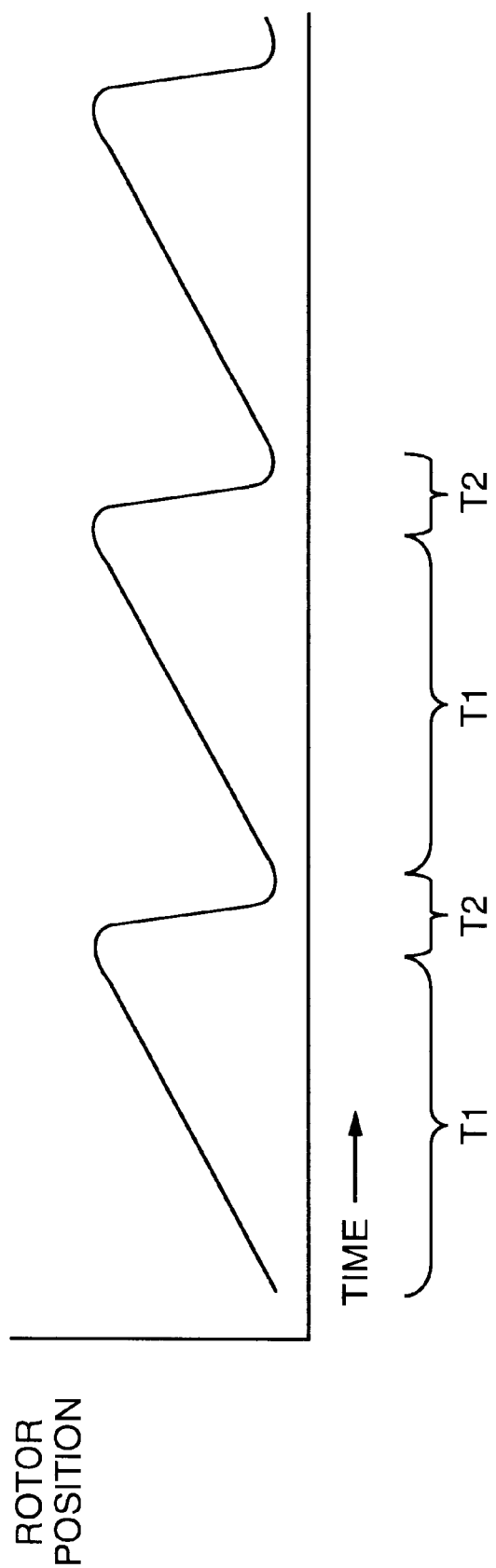
FIG. 2 is a period waveform of rotor position versus time of a scanning galvanometer, illustrating scan fly back phases of the rotor movement.

Referring to FIG. 2, in the special case of galvanometers scanners, there is commonly required a scan profile or pattern of rotor position versus time, represented here as a saw-tooth waveform W in which there is a constant velocity, no acceleration, scanning period $T_1$ followed by a rapid fly-back period $T_2$, (not to scale). As a result of the significantly shorter duration of $T_2$, over which rotor direction of movement must be changed twice and the rotor quickly relocated for the next scan, very large accelerations are applied to the rotor and large moment loads are induced at the bearings during the rapidly recurring $T_2$ periods.

When the FIG. 1 rotor 10 is operated in the FIG. 2 mode, and is in the $T_1$ scan phase, RBC O ring 54 is essentially rigid, holding bearing 52 and rotor 10 properly aligned within its rotor mount or housing for optimal precision during the scan. When rotor 10 is subjected to $T_2$ acceleration, the moment load on each RBC O ring 54 places it in a semi-rigid rheological phase, which results in a corresponding but limited degree of compliance that effectively divides the asymmetrical force between bearing 52 and O ring 54.

Figure 3:
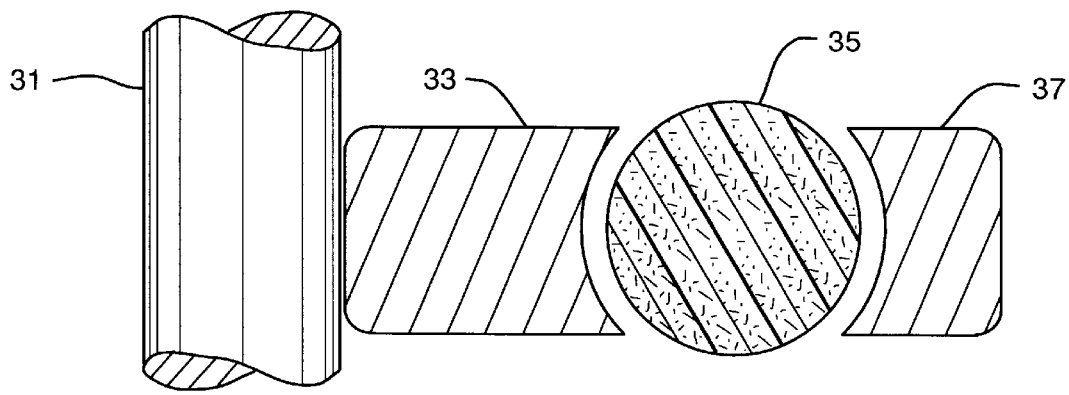
FIG. 3 is a partial cross section view of a first embodiment of the invention, illustrating an RBC O ring between a bearing and an outer bearing raceway.
Figure 4:
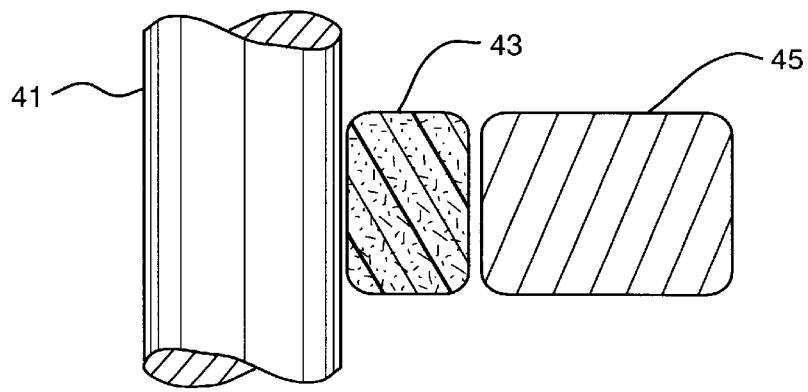
FIG. 4 is a partial cross section view of a second embodiment of the invention, illustrating an RBC collar interspersed between the rotor shaft and the bearing.
Figure 5:
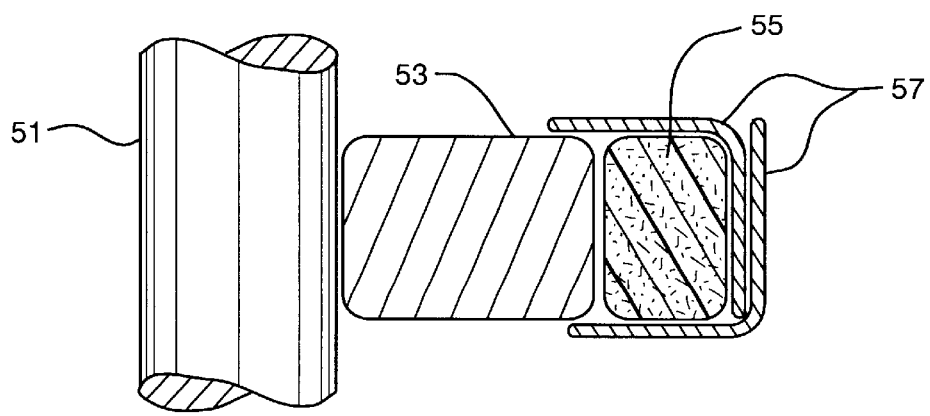
FIG. 5 is a partial cross section view of a third embodiment of the invention, illustrating an RBC collar interspersed and fully enclosed between a bearing and a two part outer bearing raceway.

While in the embodiment of FIG. 1, O rings provide a convenient form factor for the RBC element, other form factors can be used with suitable conforming support structures, arranged in alternate configurations, to achieve the benefits of the invention. Referring to FIGS. 3, 4 and 5, other embodiments of the invention include but are not limited to the FIG. 3 assemblage of rotor shaft 31, main bearing 33, RBC element 35, and outer raceway 37; the FIG. 4 assemblage of rotor shaft 41, RBC element 43, and main bearing 45; and FIG. 5 rotor shaft 51, main bearing 53, RBC element 55, and two part outer raceway assembly 57.

The FIGS. 3 and 4 embodiments provide for compression between opposing support surfaces, while permitting a degree of expansion at unsupported surfaces of the RBC element. The size and shape of the supporting surfaces can be designed in conjunction with the RBC element characteristics and size, to provide the desired rheological effects.

The FIG. 5 embodiment provides containment and compression of the cross section area of the RBC element under load, the design otherwise employing consideration of the same variables as in FIGS. 3 and 4. The two part outer raceway assembly 57 facilitates fabrication of the bearing assembly.

More complex assemblages of multiple O rings or elastomeric bearing elements of other cross section designs, and inter-support structures contacting and containing the RBC elements, permit "tuning" the rheological performance of the overall bearing design.

Figure 6:
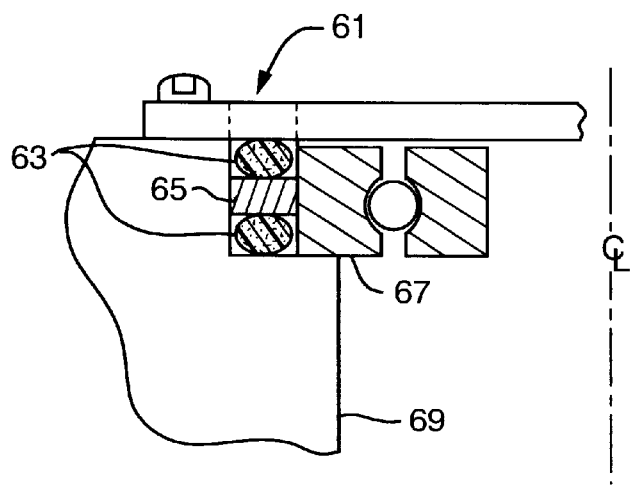
FIG. 6 is a partial section view of a multi-element RBC assembly retained by an end plate in a galvanometer housing.

Referring to FIG. 6, a two element RBC assembly 60 is illustrated, with a pair of O ring elements 63 divided by a spacer 65 interspersed between the bearing outer raceway 67 and the galvanometer housing 69, and held in position by clamp 61.

Figure 7:
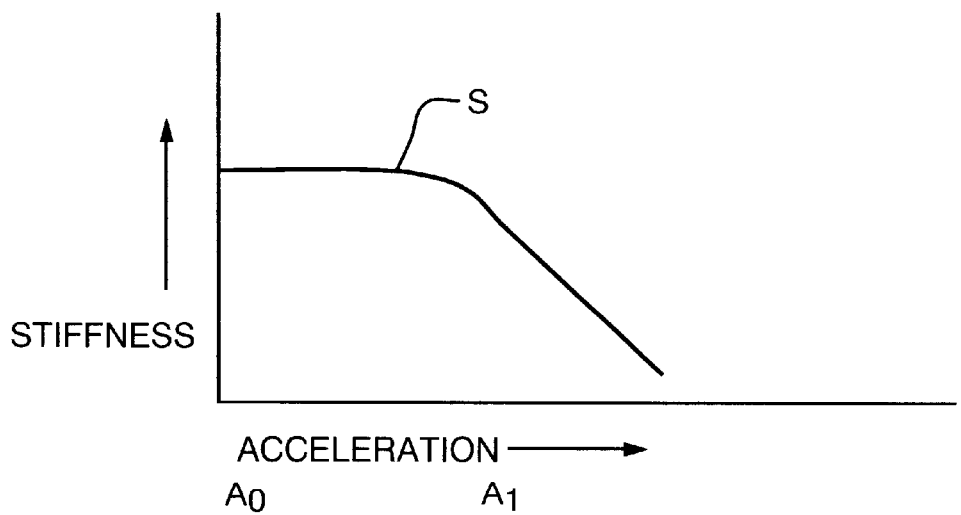
FIG. 7 is a stiffness versus acceleration-induced load plot of the general response characteristics of an RBC.

Referring to FIG. 7, there is shown a typical response curve of bearing "stiffness" S compared to the acceleration-induced load on an RBC of the invention. At no or low acceleration levels $A_0$ to $A_1$ typical of the scan phase, the stiffness of the RBC is uniformly high, assuring the desired precision of the rotor rotation relative to its design axis of rotation. As acceleration increases beyond $A_1$, the moment load on the RBC increases beyond its design load threshold, and the stiffness of the RBC erodes in a down slope curve, absorbing a portion of the bearing load with flexure at the expense of axial rotation precision, but occurring only during the fly back phase.

The invention is susceptible of many embodiments, all within the scope of the claims that follow. For example, there is a bearing assembly for a reciprocating rotor device consisting of a rheological bearing coupler and a rotor shaft bearing, where the bearing assembly is interspersed between a rotor shaft and a bearing assembly support structure. The rheological bearing coupler is configured to reduce axial bearing precision in respond to acceleration induced moment loads beyond a design threshold acceleration level. The rheological bearing coupler may consist of a circular rheological component with compressively induced rheological phase properties. The component may be confined compressively between the support structure and the rotor shaft so as bear all acceleration induced moment loads between the rotor shaft and the support structure.

The rheological bearing coupler may be configured between the rotor shaft bearing and support structure, or alternatively, between the rotor shaft bearing and the rotor shaft. The rheological component may be an O ring, or a circular member of other cross section, fabricated of materials having rheological phase properties induced by lateral compression in excess of a threshold level. The rheological bearing coupler may have two or more circular rheological components. They may be of different diameters and configured as co-planar and co-axial to the rotor bearing, or they may be stacked to as to be co-axial to the rotor bearing, and be divided or not by a spacing structure such as a washer or a partition extending from the support structure or the rotor bearing structure.

The bearing assembly may include a multi-part circular containment structure by which the O ring or other rheological component may be confined during fabrication of the bearing assembly.

As another example of the invention, there is a bearing assembly for a galvanometer scanner consisting of a rheological bearing coupler and a rotor shaft bearing, with at least the several variations described above.

As yet another example, there are both a reciprocating rotor device and a galvanometer scanner consisting of upper and lower bearing assemblies, where each bearing assembly includes a rheological bearing coupler and a rotor shaft bearing, again with at least the several variations described above.

In summary, in all cases, a bearing assembly of the invention includes a main bearing and a rheological bearing coupler, where the bearing assembly is supported by a bearing assembly support structure integral to the reciprocating rotor device, and the rotor shaft is rotably supported by the bearing assembly. The rheological bearing coupler may vary in configuration; the main bearing may vary in configuration; and the arrangement of bearing and rheological bearing coupler may vary; all such embodiments being within the scope of the invention.

I claim:

1. A bearing assembly for a rotor device comprising an elastomeric rheological bearing coupler and a rotor shaft bearing, said assembly being interposed between a rotor shaft and a hearing assembly support structure.

2. A bearing assembly for a reciprocating rotor device according to claim 1, wherein said rheological bearing coupler comprises a circular rheological component with compressively induced rheological phase properties that increase in compliance when compressive loads exceed a design threshold level.

3. A bearing assembly for a reciprocating rotor device according to claim 1, wherein said rheological bearing coupler comprises a circular rheological component with compressively induced rheological phase properties, and said bearing assembly is configurable between said rotor shaft and said bearing assembly support structure of said reciprocating rotor device so as to have said circular theological component compressively confined and absorbing moment loads from said rotor shaft in excess of a design threshold level.

4. A bearing assembly for a reciprocating rotor device according to claim 3, wherein said rheological bearing coupler is configured between said rotor shaft bearing and said support structure.

5. A bearing assembly for a reciprocating rotor device according to claim 3, wherein said rheological bearing coupler is configured between said rotor shaft bearing and said rotor shaft.

6. A bearing assembly for a reciprocating rotor device according to claim 3, said rheological component comprising an O ring fabricated of materials having rheological phase properties induced by lateral compression in excess of a threshold level.

7. A bearing assembly for a reciprocating rotor device according to claim 3, said rheological bearing coupler comprising at least two circular rheological components.

8. A bearing assembly for a reciprocating rotor device according to claim 7, said at least two circular rheological components being of different diameters and configured as co-planar and co-axial to said rotor bearing.

9. A bearing assembly for a reciprocating rotor device according to claim 7, said at least two circular rheological components being of the same diameter, configured as co-axial to said rotor bearing, and divided by a spacing structure.

10. A bearing assembly for a reciprocating device according to claim 7, further comprising a multi-part circular containment structure by which a said rheological component may be confined during fabrication of said bearing assembly.

11. A bearing assembly for a galvanometer scanner comprising a rheological bearing coupler and a rotor shalt bearing, said assembly being interposed between a rotor shaft and a bearing assembly support structure, said rheological bearing coupler configured with increasing compliance for reducing axial bearing precision in response to acceleration induced moment loads beyond a design threshold acceleration level.

12. A bearing assembly for a galvanometer scanner according to claim 11, said rheological bearing coupler comprising at least one circular rheological component with compressively induced rheological phase properties, said component confined compressively between a support structure and a said rotor shaft so as bear said acceleration induced moment loads.

13. A bearing assembly for a galvanometer scanner according to claim 12, said rheological component comprising at least one O ring fabricated of materials having rheological phase properties induced by lateral compression in excess of a threshold level.

14. A bearing assembly for a galvanometer scanner according to claim 12, said rheological bearing coupler comprising at least two circular rheological components, said at least two circular rheological components being of different diameters and configured as co-planar and co-axial to said rotor bearing.

15. A bearing assembly for a galvanometer scanner according to claim 12, said rheological bearing coupler comprising at least two circular rheological components, said at least two circular rheological components being of the same diameter, configured as co-axial to said rotor bearing, and divided by a spacing structure.

16. A bearing assembly for a reciprocating device according to claim 12, further comprising a multi-part circular containment structure by which a said rheological component may be confined during fabrication of said bearing assembly.

17. A galvanometer scanner comprising upper and lower bearing assemblies, each said bearing assembly further comprising a rheological bearing coupler and a rotor shaft bearing, said assembly being interposed between a rotor shaft and a bearing assembly support structure, said rheological bearing coupler configured to reduce axial bearing precision in response to acceleration induced moment loads on said rotor shaft beyond a design threshold acceleration level.

18. A galvanometer scanner according to claim 17, each said rheological bearing coupler comprising at least one circular elastomeric rheological component with compressively induced rheological phase properties, said rheological component confined compressively within its respective said bearing assembly.

19. A galvanometer scanner according to claim 18, said at least one rheological component comprising at least one O ring fabricated of materials having rheological phase properties induced by lateral compression in excess of a threshold level.

20. A galvanometer scanner according to claim 18, further comprising a multi-part circular containment structure by which a said rheological component may be confined during fabrication of said bearing assembly.

21. A method for supporting a rotor shaft in a rotor device, comprising the steps:

provinding an elastomeric theological bearing coupler with a rotor shaft bearing as a rheological bearing assembly, said rheological bearing coupler having compressively induced rheological phase properties that increase in compliance when compressive loads exceed a design threshold level, interposing the bearing assembly between the rotor shall of said reciprocating device and a bearing assembly support structure.

22. A method for supporting a rotor shaft according to claim 21, said rheological component comprising at least one O ring fabricated of materials having said rheological phase properties induced by lateral compression in excess of a design threshold level.

23. A bearing assembly for a rotor device comprising a rheological bearing coupler and a rotor shaft bearing wherein said bearing coupler comprises a circular rheological component with compressively induced rheological phase properties that increase in compliance when compressive loads exceed a design threshold level.

24. An elastomeric rheological bearing coupler for a rotor bearing, wherein said coupler is stiff during periods of constant velocity and is resilient during periods of large bearing moments.

25. A galvanometer scanner comprising at least one bearing assembly wherein said assembly farther comprises a rotor shaft bearing and a rheological bearing coupler wherein said coupler is stiff during periods of constant velocity and is resilient during periods of large bearing moments.

* * * * *

UNITED STATES PATENT AND TRADEMARK OFFICE
CERTIFICATE OF CORRECTION

PATENT NO. : 6,390,684 B2
DATED : May 21, 2002
INVENTOR(S) : David C. Brown

It is certified that error appears in the above-identified patent and that said Letters Patent is hereby corrected as shown below:

<u>Title page,</u>
Item [12], United States Patent, delete "Bown", insert -- Brown --
Item [75], Inventor, delete "Bown", insert -- Brown --

<u>Column 5,</u>
Line 9, delete "$CLM_V$", insert -- $CL_{MV}$ --

<u>Column 8,</u>
Line 64, delete "theological", insert -- rheological --

<u>Column 10,</u>
Line 8, delete "farther", insert -- further --

Signed and Sealed this

Third Day of June, 2003

JAMES E. ROGAN
*Director of the United States Patent and Trademark Office*